US012790860B2

(12) United States Patent
Lee et al.

(10) Patent No.: US 12,790,860 B2
(45) Date of Patent: Nov. 10, 2026

(54) LATCH APPARATUS FOR VEHICLES

(71) Applicant: PHA CO., LTD., Daegu (KR)

(72) Inventors: Byeong Gook Lee, Suwon-si (KR); Woo Seong Choi, Daegu (KR); Sang Hyuk Lee, Daegu (KR); Nigel Victor Spurr, Telford (GB); James Nelsen, Howell, MI (US)

(73) Assignee: PHA CO., LTD., Daegu (KR)

( * ) Notice: Subject to any disclaimer, the term of this patent is extended or adjusted under 35 U.S.C. 154(b) by 0 days.

(21) Appl. No.: 19/054,776

(22) Filed: Feb. 15, 2025

(65) Prior Publication Data

US 2025/0327347 A1 Oct. 23, 2025

(30) Foreign Application Priority Data

Apr. 19, 2024 (KR) ........................ 10-2024-0052793

(51) Int. Cl.
*E05B 85/26* (2014.01)
*E05B 85/24* (2014.01)

(52) U.S. Cl.
CPC ............ *E05B 85/26* (2013.01); *E05B 85/243* (2013.01)

(58) Field of Classification Search
CPC ........ E05B 81/14; E05B 81/06; E05B 85/243; E05B 85/26; E05B 77/38; E05B 77/40; E05B 79/08; E05Y 2800/422; E05Y 2900/531
USPC .......................................................... 292/240
See application file for complete search history.

(56) References Cited

U.S. PATENT DOCUMENTS 4,856,829 A * 8/1989 Nakamura .............. E05B 77/36 292/216
5,092,639 A * 3/1992 Di Giusto ............... E05B 85/26 292/216
8,303,003 B2 * 11/2012 Berghahn ................ E05B 77/38 292/216
2015/0306991 A1 * 10/2015 Ban ........................ B60N 2/366 297/463.1
2016/0362916 A1 * 12/2016 Tomaszewski ......... E05B 81/06
2019/0242163 A1 * 8/2019 Cetnar .................. E05B 17/007
2021/0355717 A1 * 11/2021 Inan ........................ E05B 85/26
(Continued)

FOREIGN PATENT DOCUMENTS

DE 10 2009 042061 A1 4/2011
DE 10 2021 132230 A1 6/2023
(Continued)

OTHER PUBLICATIONS

Extended European Search Report (EESR) issued on European Patent Application No. 25150193.8. issued on Jun. 30, 2025.
(Continued)

*Primary Examiner* — Nathan Cumar
(74) *Attorney, Agent, or Firm* — AJU IP Global PLLC

(57) ABSTRACT

The present invention relates to a latch apparatus for vehicles including a claw that is rotatably provided in a housing and in which a restraining groove into which a striker is insertable is formed and a pawl unit that restrains rotation of the claw, and the pawl unit includes an operating pawl portion that regulates the rotation of the claw and a saddle pawl that is provided on the claw, protrudes toward the operating pawl portion, and selectively contacts the operating pawl portion to restrain the rotation of the claw.

9 Claims, 8 Drawing Sheets

(56) References Cited

U.S. PATENT DOCUMENTS

| | | | | |
|---|---|---|---|---|
| 2021/0355722 | A1* | 11/2021 | Inan | E05B 77/36 |
| 2024/0018809 | A1* | 1/2024 | Hunt | E05B 77/36 |

FOREIGN PATENT DOCUMENTS

| | | | | |
|---|---|---|---|---|
| EP | 3870786 | A1 | 9/2021 | |
| JP | 5727671 | B2 | 6/2015 | |
| KR | 10-2005-0050652 | A | 5/2005 | |
| WO | WO-2020083435 | A1 * | 4/2020 | E05B 85/26 |
| WO | 2021/043368 | A1 | 3/2021 | |
| WO | 2023/036368 | A1 | 3/2023 | |
| WO | 2023/061529 | A1 | 4/2023 | |
| WO | 2024/012844 | A1 | 1/2024 | |

OTHER PUBLICATIONS

Office Action in Korean Patent Application No. 10-2024-0052793 issued on Jul. 1, 2025.

* cited by examiner

LATCH APPARATUS FOR VEHICLES

CROSS-REFERENCE TO RELATED APPLICATION

The present application claims priority to and the benefit of Korean Patent Application No. 10-2024-0052793, filed on Apr. 19, 2024 in the Korean Intellectual Property Office, the entire disclosure of which is incorporated herein by reference.

BACKGROUND

1. Field

The present invention relates to a latch apparatus for vehicles.

2. Description of the Related Art

In general, a latch apparatus installed in a vehicle locks and unlocks a door using a mechanical constraining force during a door opening and closing process.

That is, when a user pulls a door handle, the door may be unlocked since the door handle and the latch apparatus are mechanically connected.

The latch apparatus used in the door operates depending on the operation of an inside handle, an outside handle, an inside knob, and the like, and a remote controller that operates the latch apparatus may be additionally installed.

These days, an electric vehicle in which an internal combustion engine is omitted is being developed, and there is a trend in the development of a latch apparatus for vehicles into a mechanism that allows button-type opening rather than handle operation.

The background technology of the present invention is disclosed in Korean Patent Publication No. 2005-0050652 (published on May 31, 2005, title of invention: Driving device and door closer).

SUMMARY

The present invention has been conceived to improve the problems described above, and is directed to providing a latch apparatus for vehicles capable of easily opening a door even when the door is in a high reaction force state.

According to an aspect of the present invention, there is provided a latch apparatus for vehicles, including a claw that is rotatably provided in a housing and in which a restraining groove into which a striker is insertable is formed and a pawl unit that restrains rotation of the claw, and the pawl unit includes an operating pawl portion that regulates the rotation of the claw and a saddle pawl that is provided on the claw, protrudes toward the operating pawl portion, and selectively contacts the operating pawl portion to restrain the rotation of the claw.

The operating pawl portion may include a locking block rotatably coupled to the housing and formed with a locking portion in contact with the saddle pawl, an operating lever fixed to the locking block, and a second pawl that restrains rotation of the operating lever by contacting the operating lever and releases a restraint of the operating lever when an external force is applied.

The operating lever may be formed to be long within the housing.

The locking block may be provided with a damper member that prevents noise when in contact with the saddle pawl.

The claw may include a mounting unit to which the saddle pawl is coupled, and the mounting unit may include a hinge portion to which the saddle pawl is rotatably coupled and a cover bracket that prevents the saddle pawl coupled to the hinge portion from being separated.

The hinge portion may include an extension portion extending from an edge of the claw toward the operating pawl portion and a hinge protrusion formed at an end of the extension portion, and a hinge connection portion coupled to the hinge protrusion may be formed on the saddle pawl.

The hinge connection portion may be formed in a C shaped cross section surrounding a circumferential surface of the hinge protrusion, so that when the saddle pawl rotates, an end of the hinge connection portion may contact the extension portion to limit a rotation radius.

The mounting unit may include a restoration member that elastically supports the saddle pawl, and the restoration member may be mounted on the cover bracket, with one end fixed to the cover bracket and the other end fixed to the saddle pawl.

A plurality of hinge portions may be formed in a rotation radius around a rotation axis of the claw, and each of the hinge portions may be provided with the saddle pawl.

The housing may include a base and a back plate spaced apart from the base, and the operating lever and the second pawl may be provided outside the back plate.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
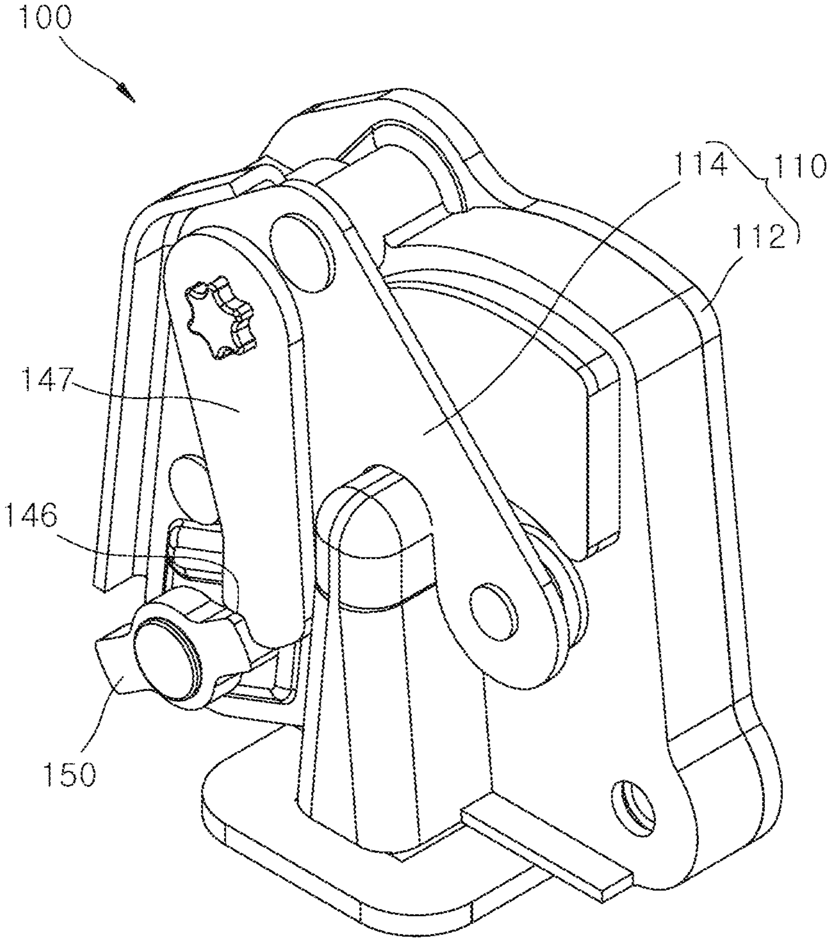
FIG. 1 is a perspective view for describing a latch apparatus for vehicles according to one embodiment of the present invention.

Hereinafter, an example of a latch apparatus for vehicles according to one embodiment of the present invention will be described with reference to the attached drawings. In the process, thicknesses of lines, dimensions of elements, and the like shown in the drawings may be exaggerated for clarity and convenience.

Also, terms described below may be defined in consideration of functions in the present disclosure, and may be changed depending on the customary practice or the intention of a user or operator. Thus, definitions of such terms should be determined based on the overall content of the present specification.

Figure 2:
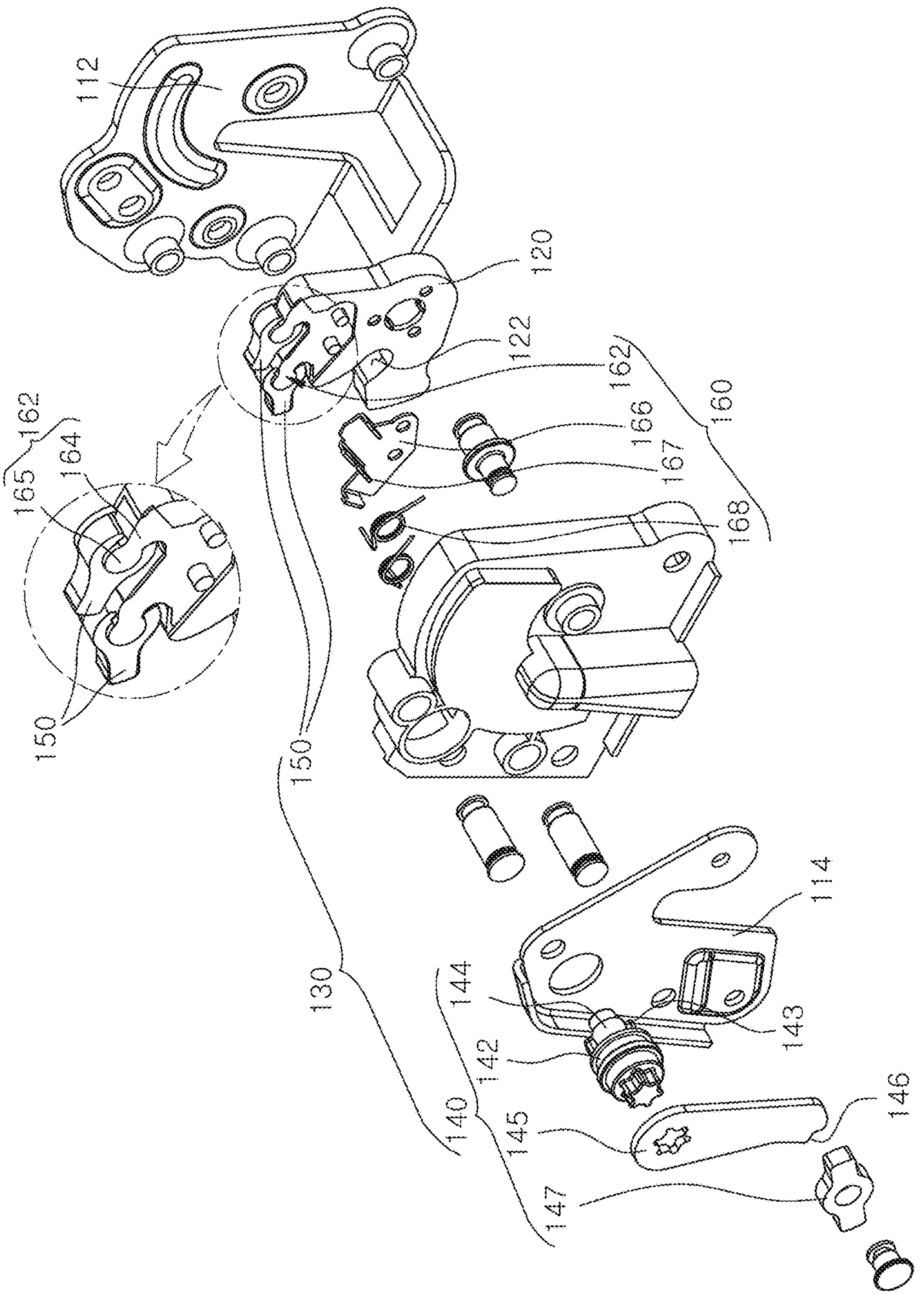
FIG. 2 is an exploded perspective view for describing the latch apparatus for vehicles according to one embodiment of the present invention.
Figure 3:
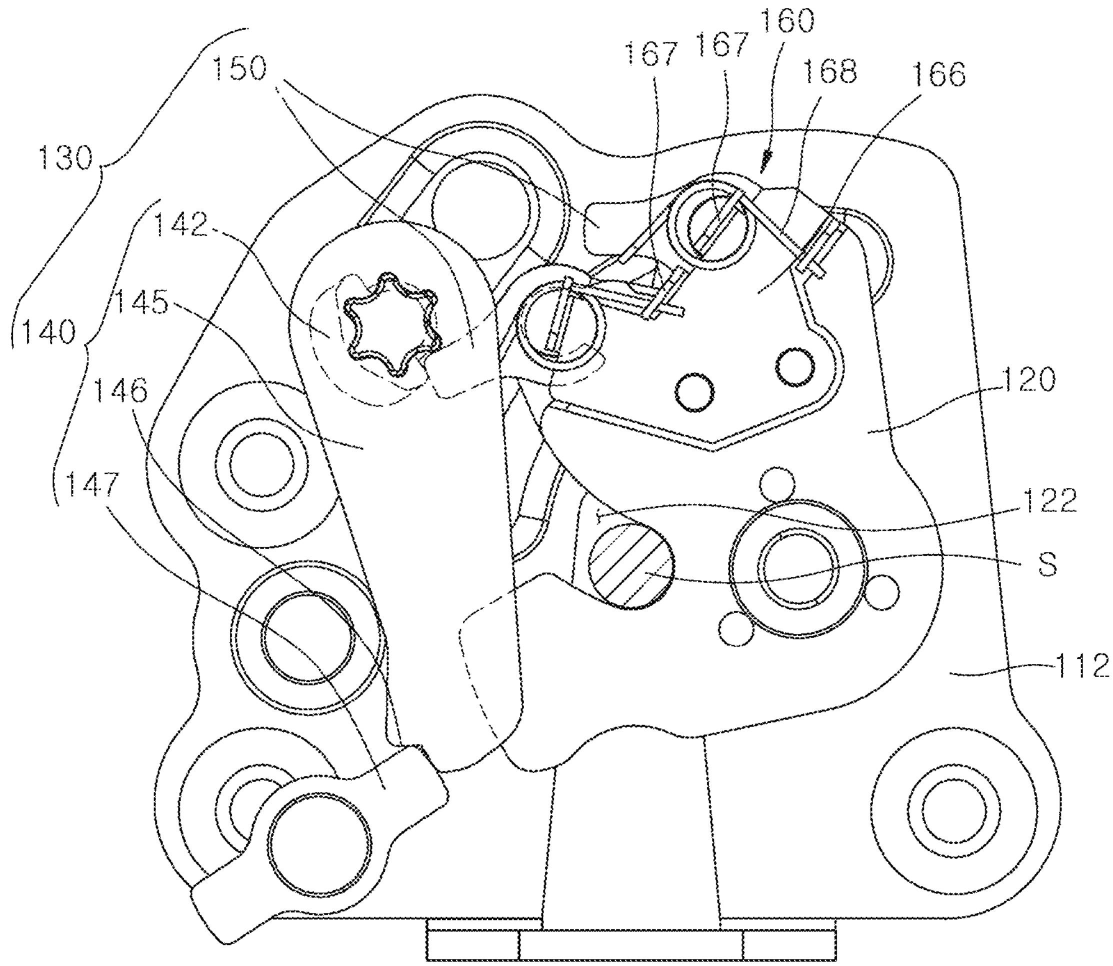
FIG. 3 is a front view for describing the latch apparatus for vehicles according to one embodiment of the present invention.
Figure 4:
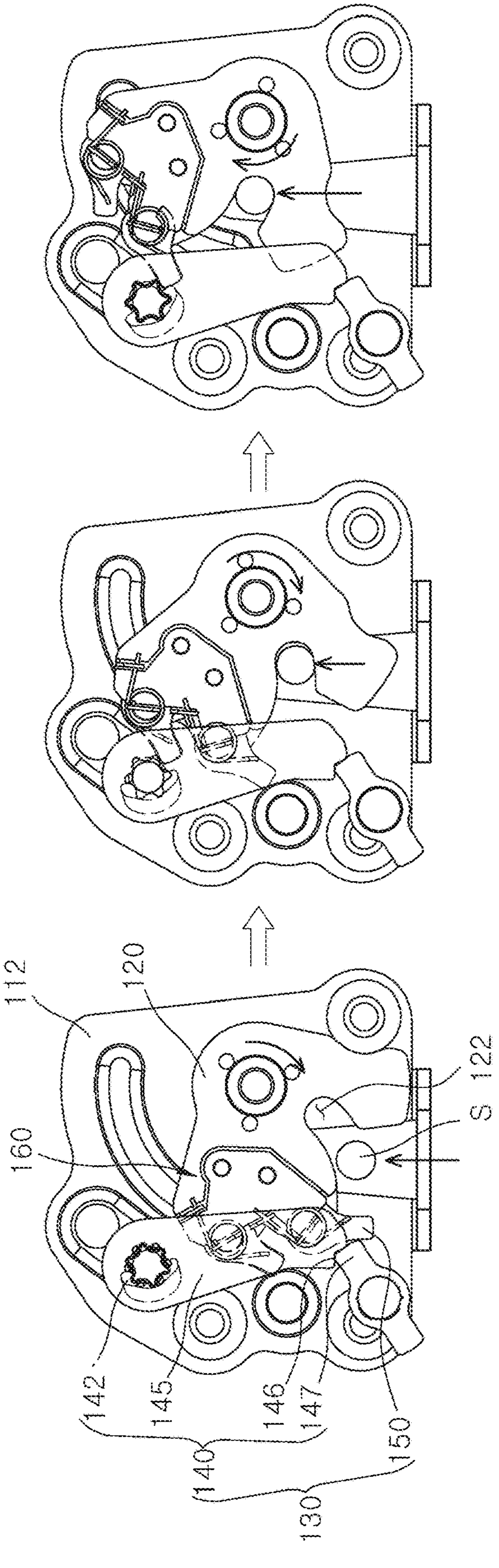
FIG. 4 is a view showing a door locking process of the latch apparatus for vehicles according to one embodiment of the present invention.
Figure 5:
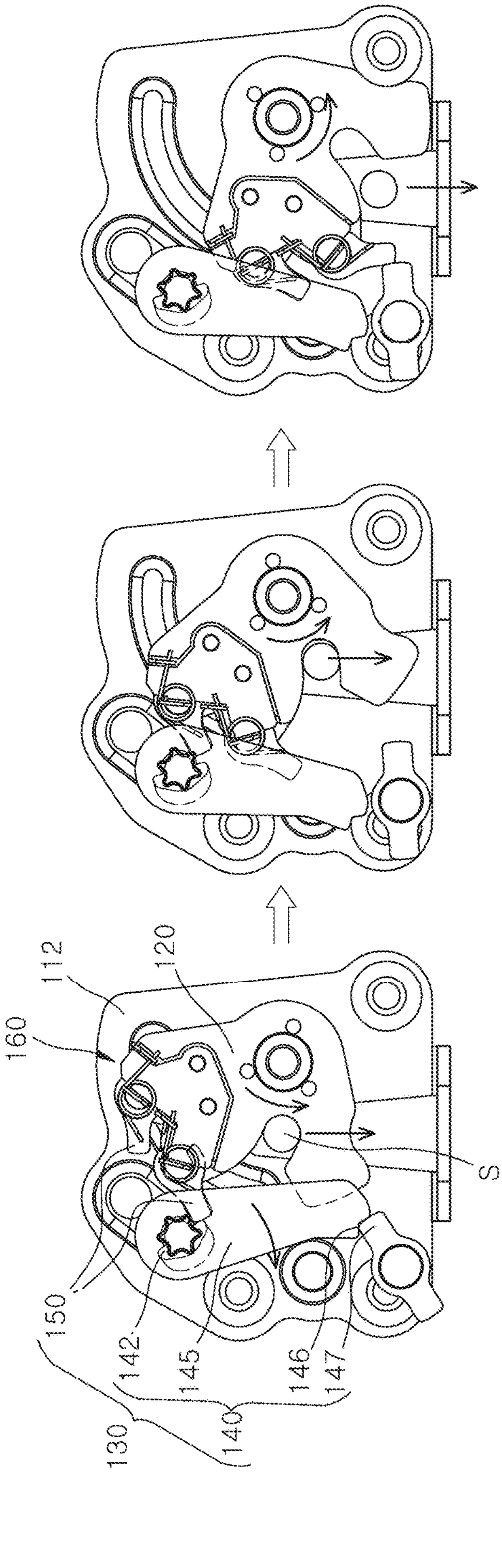
FIG. 5 is a view showing a door opening process of the latch apparatus for vehicles according to one embodiment of the present invention.
Figure 6:
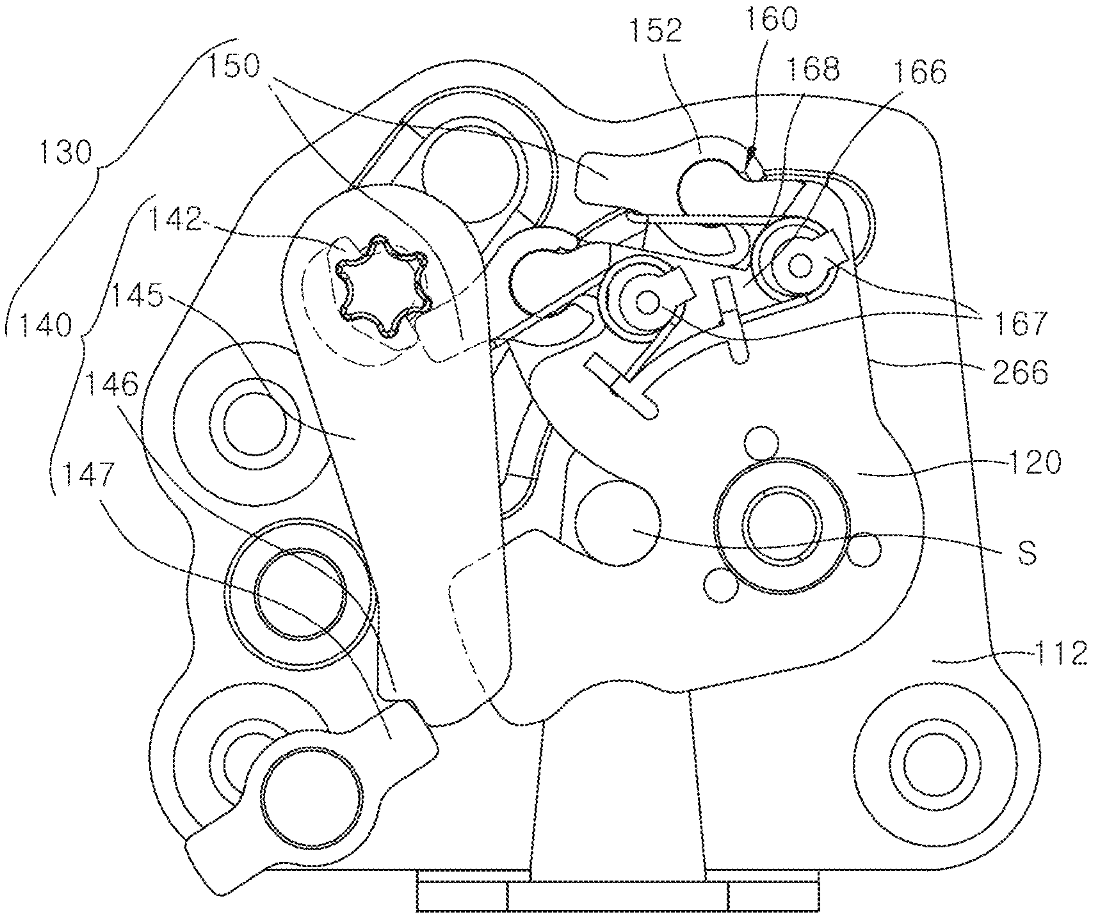
FIG. 6 is a view showing a modified example of a cover bracket of the latch apparatus for vehicles according to one embodiment of the present invention.
Figure 7:
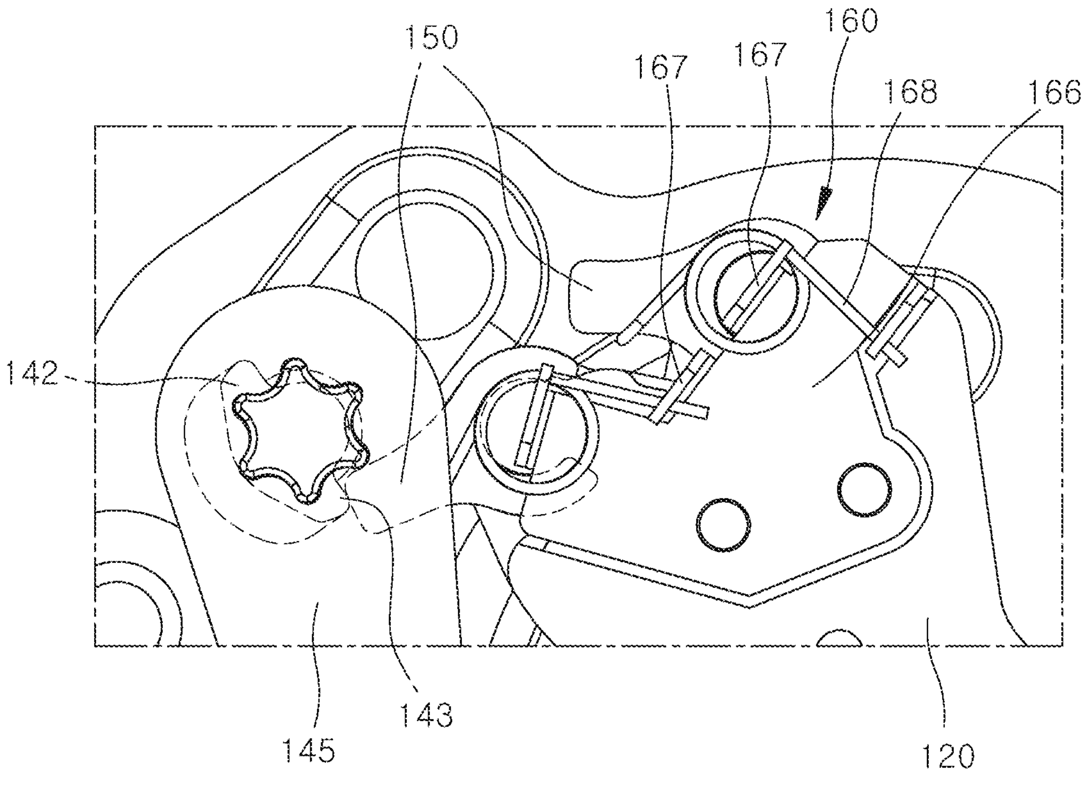
FIG. 7 is an enlarged view of a main portion of the latch apparatus for vehicles according to one embodiment of the present invention.
Figure 8:
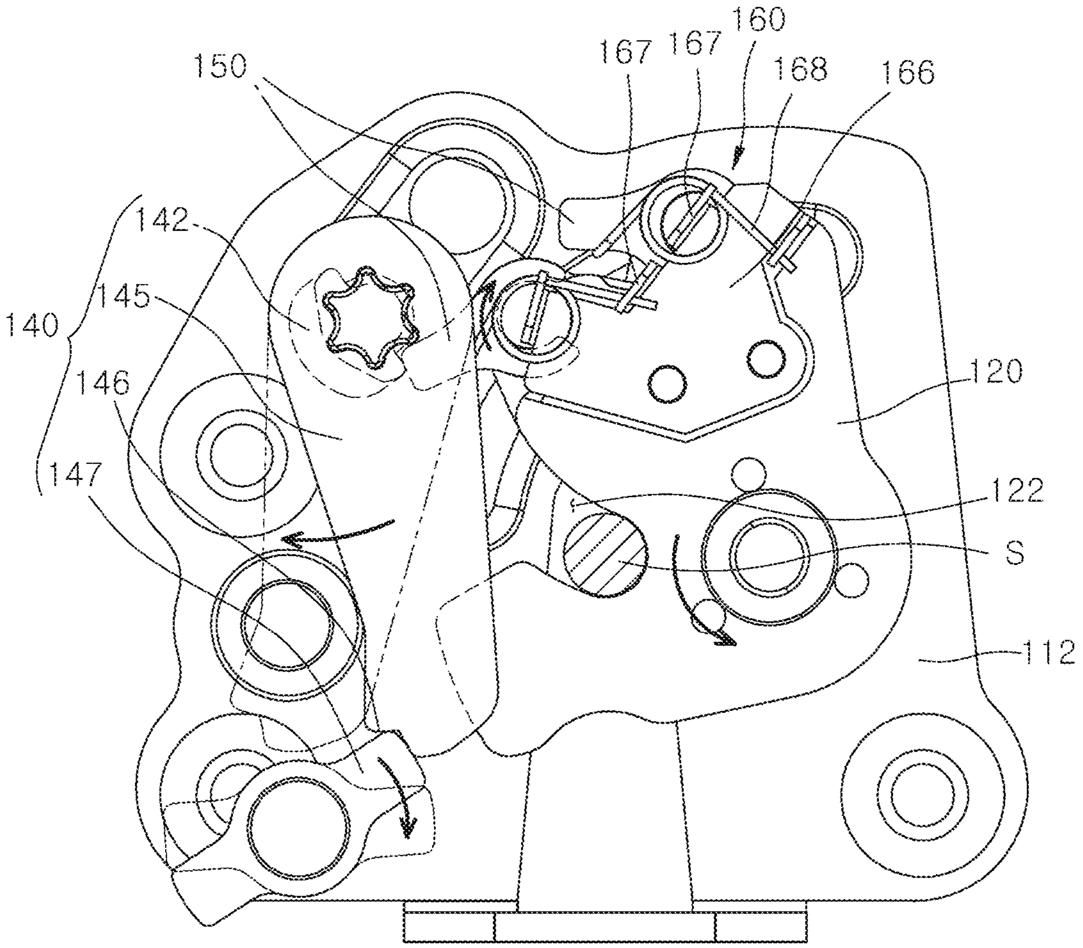
FIG. 8 is a view for describing operation of the latch apparatus for vehicles according to one embodiment of the present invention.

FIG. 1 is a perspective view for describing a latch apparatus for vehicles according to one embodiment of the present invention, FIG. 2 is an exploded perspective view for describing the latch apparatus for vehicles according to one embodiment of the present invention, FIG. 3 is a front view for describing the latch apparatus for vehicles according to one embodiment of the present invention, FIG. 4 is a view showing a door locking process of the latch apparatus for vehicles according to one embodiment of the present invention, FIG. 5 is a view showing a door opening process of the latch apparatus for vehicles according to one embodiment of the present invention, FIG. 6 is a view showing a modified example of a cover bracket of the latch apparatus for vehicles according to one embodiment of the present invention, FIG. 7 is an enlarged view of a main portion of the latch apparatus for vehicles according to one embodiment of the present invention, and FIG. 8 is a view for describing operation of the latch apparatus for vehicles according to one embodiment of the present invention.

Referring to FIGS. 1 to 8, a latch apparatus 100 for vehicles according to one embodiment of the present invention may include a claw 120 and a pawl unit 130.

The claw 120 may be rotatably provided in a housing 110, and a restraining groove 122 into which a striker S is insertable may be formed therein.

The claw 120 is supported by a coil spring (not shown) to be elastically supported in an opening direction of the claw 120.

The pawl unit 130 may restrain rotation of the claw 120. The pawl unit 130 may include an operating pawl portion 140 and a saddle pawl 150.

The operating pawl portion 140 may regulate the rotation of the claw 120. The operating pawl portion 140 may include a locking block 142, an operating lever 145, and a second pawl 147.

The locking block 142 may be rotatably coupled to the housing 110, and a locking portion 143 in contact with the saddle pawl 150 may be formed therein.

The locking block 142 may be provided with a damper member 144 to prevent noise when in contact with the saddle pawl 150. The damper member 144 is made of a covering made of a synthetic resin material that surrounds the circumference of the locking block 142, and may prevent noise when in contact with the saddle pawl 150.

The operating lever 145 may be fixed to the locking block 142, so that the locking block 142 may be rotated when a release is operated.

It is preferable that the operating lever 145 is formed to be long within the housing 110. To this end, a position of the locking block 142 and a position of the second pawl 147 may be disposed at a predetermined distance apart within the housing 110, and corresponding thereto, the operating lever 145 may be formed to be long by a predetermined length, so that rotational torque of the locking block 142 may be improved by the length of the operating lever 145 when released by the release operation of the second pawl 147. In this way, the door in a state of a high reaction force may be easily opened with a small force.

In the present embodiment, it is shown that the rotational torque is improved by forming the length of the operating lever 145 as long as possible within the housing 110, but the present embodiment is not limited thereto, and various modified designs are possible, such as improving the rotational torque by forming an eccentric load portion on the operating lever 145.

The second pawl 147 may regulate rotation of the operating lever 145. The second pawl 147 may restrain the rotation of the operating lever 145 by contacting the operating lever 145 and release the restraint of the operating lever 145 when an external force is applied.

The application of an external force in the present embodiment means the operation of a release operating unit to open the door. Although not shown, the release operating unit may include a release button provided in the vehicle and a release motor that is operated by applying an electrical signal through the operation of the release button.

The saddle pawl 150 may be provided on the claw 120, protrude toward the operating pawl portion 140, and selectively contact the operating pawl portion 140 to restrain the rotation of the claw 120.

The saddle pawl 150 may be mounted on the claw 120 by a mounting unit 160. The mounting unit 160 may include a hinge portion 162 to which the saddle pawl 150 is rotatably coupled, and a cover bracket 166 to prevent the saddle pawl 150 coupled to the hinge portion 162 from being separated.

The hinge portion 162 may include an extension portion 164 extending from an edge of the claw 120 toward the operating pawl portion 140 and a hinge protrusion 165 formed at an end of the extension portion 164.

It is preferable that the hinge protrusion 165 has a diameter larger than the thickness of the extension portion 164.

A hinge connection portion 152 coupled to the hinge protrusion 165 may be formed on the saddle pawl 150.

In more detail, as shown in an enlarged portion of FIG. 2, the hinge connection portion 152 may be formed in a "C" shaped cross section surrounding a circumferential surface of the hinge protrusion 165, so that when the saddle pawl 150 rotates, an end of the hinge connection portion 152 may contact the extension portion 164 to limit a rotation radius.

Structural features of the hinge portion 162 and the hinge protrusion 165 may prevent the saddle pawl 150 from being rotated to a position where return is impossible due to excessive rotation.

In the present embodiment, by constructing the hinge portion 162 in a form having the same plane as the saddle pawl 150, rather than forming the hinge portion 162 as a separate axis, the claw 120 may be slimmed, so that the overall volume of the latch apparatus 100 may be reduced.

In addition, the present embodiment has a simple structure since the present embodiment does not have a separate stopper for limiting the rotation radius due to the shape of the hinge connection portion 152 of the saddle pawl 150.

The mounting unit 160 may include a restoration member 168 that elastically supports the saddle pawl 150. The restoration member 168 may be mounted on the cover bracket 166, with one end fixed to the cover bracket 166 and the other end fixed to the saddle pawl 150.

A fixing protrusion 167 for fixing the restoration member 168 may be formed on the cover bracket 166, the center of the restoration member 168 may be coupled to the fixing protrusion 167, one end thereof may be supported on the cover bracket 166, and the other end thereof may be supported on the saddle pawl 150.

As shown in FIG. 6, as a modified example of the cover bracket 166, the cover bracket 166 may be formed to surround the entire claw 120. The cover bracket 166 may be formed of a covering made of a synthetic resin material to prevent noise.

A plurality of hinge portions 162 may be formed in a rotation radius around a rotation axis of the claw 120, and each of the hinge portions 162 may be provided with the saddle pawl 150.

That is, the saddle pawl 150 may form a first locking stage and a second locking stage that are adhered to the locking block 142.

The housing 110 of the present embodiment may include a base 112 and a back plate 114 spaced apart from the base 112. A space is separated by the base 112 and the back plate 114 to prevent interference between respective components.

As shown in FIG. 1 or 2, the operating lever 145 and the second pawl 147 may be provided outside the back plate 114, and the claw 120 in which the locking block 142 and the saddle pawl 150 formed on the same plane as the claw 120 is included may be provided between the housing 110 and the back plate 114.

Hereinafter, the operation and effect of the latch apparatus for vehicles according to one embodiment of the present invention will be described as follows.

In a state in which the door of the vehicle is fully open, the restraining groove 122 of the claw 120 is rotated in an open state.

As shown in FIG. 4, when the claw 120 is rotated counterclockwise by the entry of the striker S, a lower saddle pawl 150, which serves as the second locking stage of the claw 120, may restrain the striker S by being seated and fixed on the locking portion 143 of the locking block 142, so that a closed state of the door may be maintained.

This is when the normal door is fully closed, and when a closing force of the door is insufficient, an upper saddle pawl 150, which serves as the first locking stage of the claw 120, may be seated on the locking portion 143 of the locking block 142, so that first-stage locking may be achieved.

Since a direction of the force of the saddle pawl 150 is toward the locking portion 143 of the locking block 142, the locking state may be maintained, thereby preventing rotation of the claw 120, so that the restraint of the striker S may be maintained.

Describing the release operation by the release operating unit with reference to FIGS. 5, 7, and 8, when the release motor is driven by the operation of the release button, the second pawl 147 rotates clockwise by driving the release motor, the operating lever 145 whose rotation is restrained by the second pawl 147 is rotated, and the locking block 142 is rotated by the rotation of the operating lever 145, thereby releasing the binding between the saddle pawl 150 and the locking portion 143.

By forming the operating lever 145 to be long within the housing 110, the rotational torque of the locking block 142 may be improved, thereby allowing the release operation with a small force for releasing the binding of the second pawl and the operating lever 145.

In addition, the binding of the saddle pawl 150 and the locking portion 143 may minimize the frictional force by the rotation of the saddle pawl 150 rotatably provided on the hinge portion 162 of the claw 120, thereby easily achieving the release operation with a smaller force along with the rotation of the locking block 142.

That is, the locking block 142 and the saddle pawl 150 may be rotated in opposite directions due to the release operation, thereby performing the release while minimizing the frictional force.

With this action, the door may be easily opened with a small force of the release motor, since a large force is not required, there is an effect of increasing the durability of the release motor, and since a small capacity release motor may be applied, there is an effect of reducing manufacturing costs.

Since the saddle pawl 150 has a structure of being formed on the same plane as the claw 120, the compact latch apparatus 100 may be provided.

The hinge connection between the saddle pawl 150 and the hinge portion 162 may limit the rotation radius of the saddle pawl 150 due to the structure thereof, thereby preventing malfunctions that may occur due to excessive rotation, so that operational reliability may be secured.

As described above, according to the present invention, there is an effect of easily opening the door with low energy even in a state of a high reaction force of the door and reducing manufacturing costs by increasing the durability of the motor or applying a low-capacity motor.

As described above, a latch apparatus for vehicles according to the present invention can open a button-type door with low energy when the door is opened, thereby reducing a load of a release motor to improve durability and expand lifespan, and applying a small capacity release motor to reduce costs.

In particular, the present invention can perform a release with a small force by minimizing a frictional force between a locking block and a saddle pawl by rotation of the locking block by the operation of a release operating unit and rotation of the saddle pawl hingedly connected to a claw.

In addition, the present invention can provide a compact product due to a structural feature of hingedly connecting a claw and a saddle pawl on the same plane and limit a rotation radius of the saddle pawl, thereby preventing malfunctions that may occur due to excessive rotation.

Although the present invention has been described with reference to the embodiments illustrated in the drawings, it is merely exemplary, and it is to be understood to those skilled in the art that various modifications and equivalent other embodiments could be made therefrom.

Therefore, the true technical protection scope of the present invention should be defined only by the claims.

What is claimed is:

1. A latch apparatus for vehicles, comprising:

a claw that is rotatably provided in a housing and in which a restraining groove into which a striker is insertable is formed; and a pawl unit that restrains rotation of the claw, wherein the pawl unit includes:

an operating pawl portion that regulates the rotation of the claw; and a saddle pawl that is provided on the claw, protrudes toward the operating pawl portion, and selectively contacts the operating pawl portion to restrain the rotation of the claw, wherein the operating pawl portion includes:

a locking block rotatably coupled to the housing and formed with a locking portion in contact with the saddle pawl;

an operating lever fixed to the locking block; and a second pawl that restrains rotation of the operating lever by contacting the operating lever and releases a restraint of the operating lever when an external force is applied.

2. The latch apparatus of claim 1, wherein the operating lever is formed to be long within the housing.

3. The latch apparatus of claim 1, wherein the locking block is provided with a damper member that prevents noise when in contact with the saddle pawl.

4. The latch apparatus of claim 1, wherein the claw includes a mounting unit to which the saddle pawl is coupled, and the mounting unit includes:

a hinge portion to which the saddle pawl is rotatably coupled; and a cover bracket that prevents the saddle pawl coupled to the hinge portion from being separated.

5. The latch apparatus of claim 4, wherein the hinge portion includes:

an extension portion extending from an edge of the claw toward the operating pawl portion; and a hinge protrusion formed at an end of the extension portion, and a hinge connection portion coupled to the hinge protrusion is formed on the saddle pawl.

6. The latch apparatus of claim 5, wherein the hinge connection portion is formed in a C shaped cross section surrounding a circumferential surface of the hinge protrusion so that when the saddle pawl rotates, an end of the hinge connection portion contacts the extension portion to limit a rotation radius.

7. The latch apparatus of claim 4, wherein the mounting unit includes a restoration member that elastically supports the saddle pawl, and the restoration member is mounted on the cover bracket, with one end fixed to the cover bracket and the other end fixed to the saddle pawl.

8. The latch apparatus of claim 4, wherein a plurality of hinge portions are formed in a rotation radius around a rotation axis of the claw, and each of the hinge portions is provided with the saddle pawl.

9. The latch apparatus of claim 1, wherein the housing includes:

a base; and a back plate spaced apart from the base, and the operating lever and the second pawl are provided outside the back plate.

* * * * *